United States Patent
Tsou

(10) Patent No.: US 8,415,886 B2
(45) Date of Patent: Apr. 9, 2013

(54) ENERGY-SAVING STREET LIGHTING CONTROL SYSTEM

(75) Inventor: Chia-Chun Tsou, Taipei County (TW)

(73) Assignee: Utechzone Co., Ltd., Jhonghe, Taipei County (TW)

(*) Notice: Subject to any disclaimer, the term of this patent is extended or adjusted under 35 U.S.C. 154(b) by 419 days.

(21) Appl. No.: 12/819,064

(22) Filed: Jun. 18, 2010

(65) Prior Publication Data

US 2010/0320917 A1    Dec. 23, 2010

(30) Foreign Application Priority Data

Jun. 18, 2009    (TW) ................................ 98120547 A

(51) Int. Cl.
*H05B 37/00*    (2006.01)

(52) U.S. Cl. .......................... 315/149; 315/152; 315/159

(58) Field of Classification Search .................. 315/149, 315/156, 159, 158, 157, 155, 150, 152, 153, 315/151, 154; 340/907, 908, 815.4
See application file for complete search history.

(56) References Cited

U.S. PATENT DOCUMENTS

| 6,288,492 B1* | 9/2001 | Wolfe ............................. 315/82 |
| 7,808,402 B1* | 10/2010 | Colby ........................... 340/907 |
| 2004/0036629 A1* | 2/2004 | Jones et al. .................. 340/908 |

* cited by examiner

*Primary Examiner* — David H Vu
(74) *Attorney, Agent, or Firm* — Muncy, Geissler, Olds & Lowe, PLLC

(57) ABSTRACT

A lighting control system for controlling a luminaire includes detection module and a control unit. The detection module is configured to detect traffic flow of a road and ambient light along the road. The control unit coupled with the detection module is configured to receive a detection result of the detection module and generate a control signal according to the detection result and a preset data stored therein for controlling illumination of the luminaire.

6 Claims, 1 Drawing Sheet

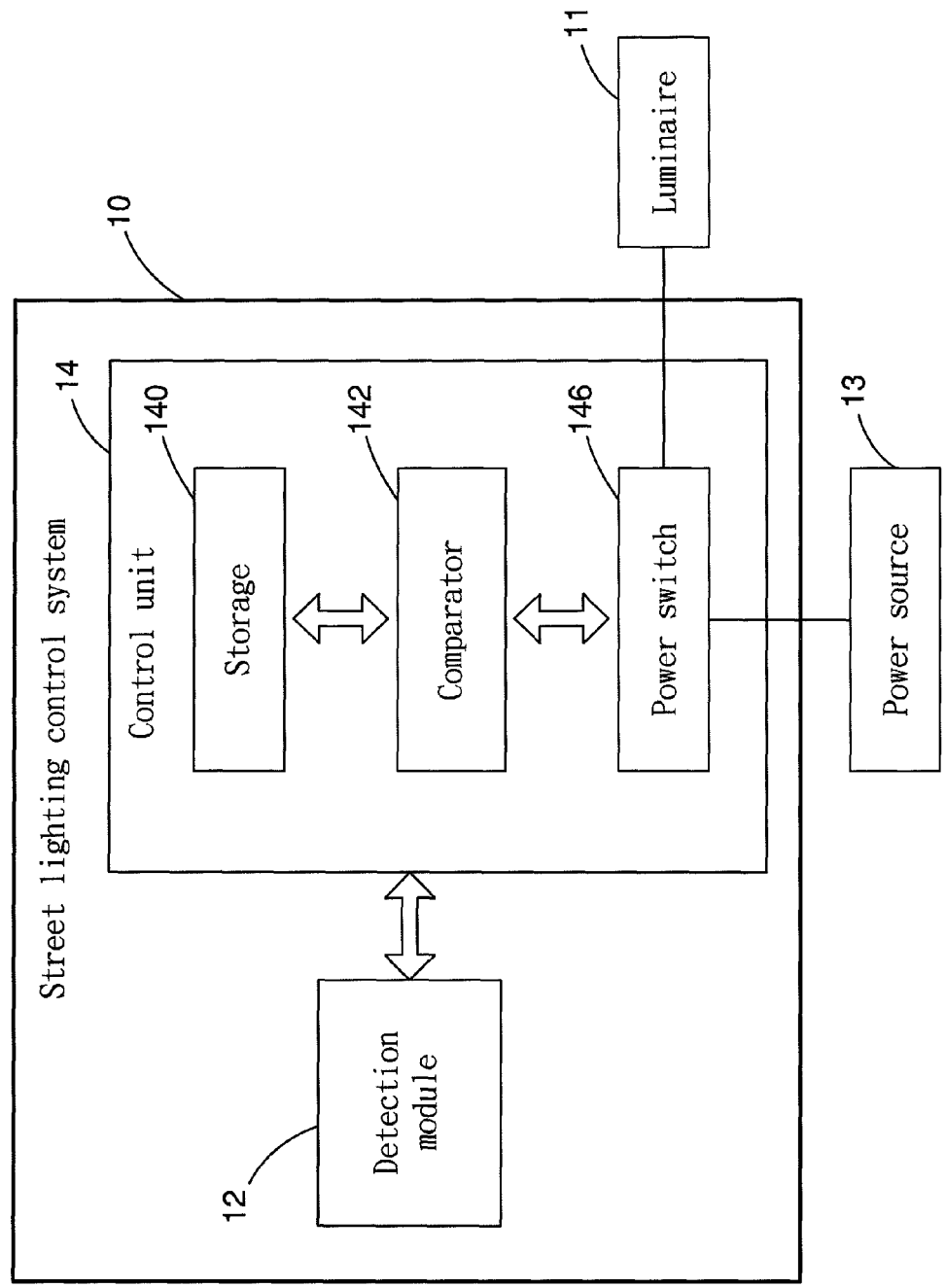

ENERGY-SAVING STREET LIGHTING CONTROL SYSTEM

BACKGROUND OF INVENTION

1. Field of Invention

The present invention relates to a street lighting system and in particular to a street lighting system which includes an energy-saving lighting control system.

2. Related Prior Art

Traditional light fixtures, such as mercury lamps, are used for street lighting. However, with the traditional light fixtures, there is a shortage of high power consumption and short lifetime in the street lighting system.

Nowadays, a relatively energy-saving LED light fixtures are widely used in the street lighting system with the advantage of low power consumption, high illumination and long lifetime to replace the traditional street lighting system.

Furthermore, by virtue of the solar energy techniques, solar-powered LED street lights are also used in the street lighting system, which saves even more energy. However, the cost of building up the system is relatively higher.

SUMMARY OF INVENTION

In one aspect, the present invention is directed to an energy-saving street lighting control system, which controls of a luminaire according to traffic conditions.

Generally, the street lighting control system is to be coupled with a luminaire and includes a detection module and a control unit. The detection module is configured to detect traffic flow of a road and ambient light along the road. The control unit is coupled with the detection module and is configured to receive a detection result of the detection module and generate a control signal according to the detection result and a preset data stored therein for controlling illumination of the luminaire.

The control unit may also include a comparator and storage coupled with the comparator for storing the preset data. The comparator is configured to retrieve the preset data, compare the preset data with the detection result of the detection module, and output the control signal according to the compare result. In addition, the control unit may further include a power switch coupled with the comparator for turning on or off the luminaire according to the control signal.

In another aspect, this invention is directed to a lighting system which includes a luminaire and a lighting control system coupled to the luminaire. The luminaire is composed of a string of street lamps. Similar to the above, the lighting control system includes a detection module and a control unit. The detection module is configured to detect traffic flow of a road and ambient light along the road. The control unit coupled with the detection module is configured to receive a detection result of the detection module and generate a control signal for controlling illumination of the street lamps according to the detection result and a preset data stored therein.

Further features and advantages of the present invention will be appreciated by review of the following detailed description of the invention.

BRIEF DESCRIPTION OF DRAWINGS

The invention is illustrated by the accompanying drawings in which corresponding parts are identified by the same numerals and in which:

FIG. 1 is a block diagram of a lighting system according to one embodiment of this invention.

DETAILED DESCRIPTION OF PREFERRED EMBODIMENT

FIG. 1 illustrates a lighting system in accordance with the preferred embodiment of the invention. According to the drawings, a street lighting control system 10 utilized in the lighting system includes a detection module 12 and a control unit 14. The control unit 14 has one end coupled with the detection module 12 and the other end to be connected to a luminaire 11. The luminaire 11 may be one street lamp or a string of street lamps (not shown) arranged along a road.

The detection module 12 is configured to detect traffic flow of a road according to speed of every individual vehicle or the number of vehicles that pass through a point on the road over a fixed period of time. The detection module 12 can also detect ambient light, such as illumination, along the road. In addition, the detection module 12 can transfer its detection result to the control unit 14.

The control unit 14, when coupled with the detection module 12 and luminaire 11, is able to control the illumination of the luminaire 11. Specifically, the control unit 14 includes storage 140, a comparator 142 and a power switch 146. The power switch 146 is connected with the comparator 143, the luminaire 11 and a power source 13. The control unit 14 has at least one preset data stored in the storage 140. On one hand the comparator 142 is able to receive the detection result from the detection module 12, and on the other hand the comparator 142 is coupled with the storage 140 to retrieve the preset data from the storage 140. Further, the comparator 142 can compare the detection result with the preset data, and output a corresponding control signal according to the compare result. The power switch 146 is able to receive the corresponding control signal from the comparator 142 and turn on or off the luminaire 11 according to the received control signal.

For instance, the comparator 142 can compare an illumination value of the ambient light and a specific value of the preset data stored in the storage 140 and then output a control signal according to the compare result. According to the control signal, the power switch 146 decides how to control the illumination or power state of the luminaire 11.

After the detection module 12 transfers its detection result to the control unit 14, the comparator 142 of the control unit 14 makes a comparison between the detection result and the preset data stored in the storage 140. It is understood noted that if the current traffic flow on a road is large and the ambient light is sufficient, there is no need to provide illumination for the road. Thus, if a large traffic flow is detected according to the detection result, the comparator 142 sends a control signal to the power switch 146 to stop the power switch 146 from working. At this time, the power source 13 stops supplying electric power to the luminaire 11 and no energy is wasted. On the contrary, if an insufficient ambient light is detected according to the detection result, the comparator 142 sends another control signal to the power switch 146 to activate the same. At this time, the power source 13 gives electric power to the luminaire 11 for enough road illumination.

It will be appreciated that although a particular embodiment of the invention has been shown and described, modifications may be made. It is intended in the claims to cover such modifications which come within the spirit and scope of the invention.

The invention claimed is:

1. A street lighting control system for control of a plurality of street lamps arranged along a road, comprising:
   a detection module configured to detect traffic flow of a road and ambient light along the road, so as to generate a detection result; and
   a control unit coupled with the detection module, and configured to receive the detection result from the detection module and generate a control signal according to the detection result and a preset data stored therein for controlling illumination of the street lamps, wherein the control unit controls a part of the street lamps to be turned off when the detection result shows that the traffic flow of the road is large and the ambient light is sufficient, and controls a part of the street lamps to be turned on when the detection result shows that the ambient light is insufficient.

2. The street lighting control system of claim 1, wherein the control unit includes storage for storing the preset data.

3. The street lighting control system of claim 2, wherein the control unit further includes a comparator coupled to the storage; and the comparator is configured to retrieve the preset data, compare the detection result of the detection module with the preset data, and output the control signal according to the compare result.

4. The street lighting control system of claim 3, wherein the control unit further includes a power switch coupled with the comparator, and the power switch is provided to turn on or off the street lamps according to the control signal.

5. The street lighting control system of claim 1, wherein the traffic flow of the road includes speed of every individual vehicle.

6. The street lighting control system of claim 1, wherein the traffic flow of the road includes the number of vehicles that pass through a point on the road over a fixed period of time.

\* \* \* \* \*